United States Patent
Greenawalt

(10) Patent No.: US 12,019,021 B2
(45) Date of Patent: Jun. 25, 2024

(54) ZINC MEASUREMENT

(71) Applicant: Hach Company, Loveland, CO (US)

(72) Inventor: Angella Nicholle Greenawalt, Fort Collins, CO (US)

(73) Assignee: HACH COMPANY, Loveland, CO (US)

(*) Notice: Subject to any disclaimer, the term of this patent is extended or adjusted under 35 U.S.C. 154(b) by 213 days.

(21) Appl. No.: 16/883,595

(22) Filed: May 26, 2020

(65) Prior Publication Data

US 2021/0372924 A1 Dec. 2, 2021

(51) Int. Cl.
G01N 21/64 (2006.01)

(52) U.S. Cl.
CPC ... G01N 21/643 (2013.01); *G01N 2021/6439* (2013.01)

(58) Field of Classification Search
USPC ........................................................ 436/172
See application file for complete search history.

(56) References Cited

PUBLICATIONS

Soroka, K. et a. Fluorescence Properties of Metal Complexes of 8-Hydroxyquinoline-5-sulfonic Acid and Chromatographic Applications, Analytical Chemistry, 59, 629-636 (Year: 1987).*
European Patent Office, International Search Report, Sep. 10, 2021, 3 pages.
Denise A. Phillips et al., "Enhancement and Quenching of Fluorescence of Metal Chelates of 8-Hydroxyquinoline-5-Sulfonic Acid", Mikrochimica Acta, 1986, 15 pages, Springer-Verlag 1987.
R. Van Slageren et al., "Determination of traces of zinc by fluorimetrically indicated complexometric titrations", Talanta, Aug. 1973, 9 pages, vol. 20, Issue 8, Pergamon Press, Great Britain.
V. Patrovsky, "Fluorimetrische Magnesiumbestimmung mit 8-Hydroxychinolin-5-sulfonsaure in Gegenwart von Calcium", Fresenius' Zeitschrift fur analytische Chemie, Mar. 26, 1966, 2 pages, vol. 230, SpringerLink.

* cited by examiner

Primary Examiner — Xiaoyun R Xu
(74) Attorney, Agent, or Firm — Ference & Associates LLC

(57) ABSTRACT

An embodiment provides a method for measuring zinc in a solution, including: preparing an indicator solution; introducing the indicator solution to a solution, wherein the solution contains an amount of zinc and the introducing causes a change in fluorescence of the solution in response to the indicator solution reacting with the zinc; and measuring the amount of zinc in the solution by measuring a change in intensity of the fluorescence. Other aspects are described and claimed.

18 Claims, 5 Drawing Sheets

A.

Excitation: 365 nm
Emission: 365 – 600 nm

B.

Excitation: 300 – 410 nm
Emission: 524 nm

ZINC MEASUREMENT

BACKGROUND

This application relates generally to measuring zinc in aqueous or liquid samples, and, more particularly, to the measurement of low concentrations of zinc using a fluorescent method.

Ensuring water quality is critical in a number of industries such as pharmaceuticals and other manufacturing fields. Additionally, ensuring water quality is critical to the health and well-being of humans, animals, and plants which are reliant on the water for survival. One element that is typically measured is zinc. Too much zinc in water can be harmful to humans or animals. Zinc may have long-term health effects and may cause the water to be less desirable to consumers or facilities. Zinc may be present from natural or human activities such as manufacturing. Measurement and mitigation of zinc may result in higher costs of water treatment. Therefore, detecting the presence and concentration of zinc in water or other liquid solutions is vital.

BRIEF SUMMARY

In summary, one embodiment provides a method for measuring zinc in a solution, comprising: preparing an indicator solution; introducing the indicator solution to a solution, wherein the solution contains an amount of zinc and the introducing causes a change in fluorescence of the solution in response to the indicator solution reacting with the zinc; and measuring the amount of zinc in the solution by measuring a change in intensity of the fluorescence.

Another embodiment provides a measurement device for measuring zinc in a solution, comprising: a processor; and a memory storing instructions executable by the processor to: prepare a sulfonic acid indicator; introduce the indicator solution to a solution, wherein the solution contains an amount of zinc and the introducing causes a change in fluorescence of the solution in response to the indicator solution reacting with the zinc; and measure the amount of zinc in the solution by measuring a change in intensity of the fluorescence.

A further embodiment provides a method for measuring zinc in a solution, comprising: preparing an indicator solution, wherein the indicator solution comprises a 8-hydroxy-5-quinoline sulfonic acid; introducing the indicator solution and a surfactant to a solution, wherein the solution comprises a water sample and contains an amount of zinc, wherein the introducing causes a change in fluorescence of the solution in response to the indicator solution reacting with the zinc; and measuring the amount of zinc in the solution by measuring a change in intensity of the fluorescence, wherein the fluorescence intensity is proportional to a concentration of the zinc in the solution.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
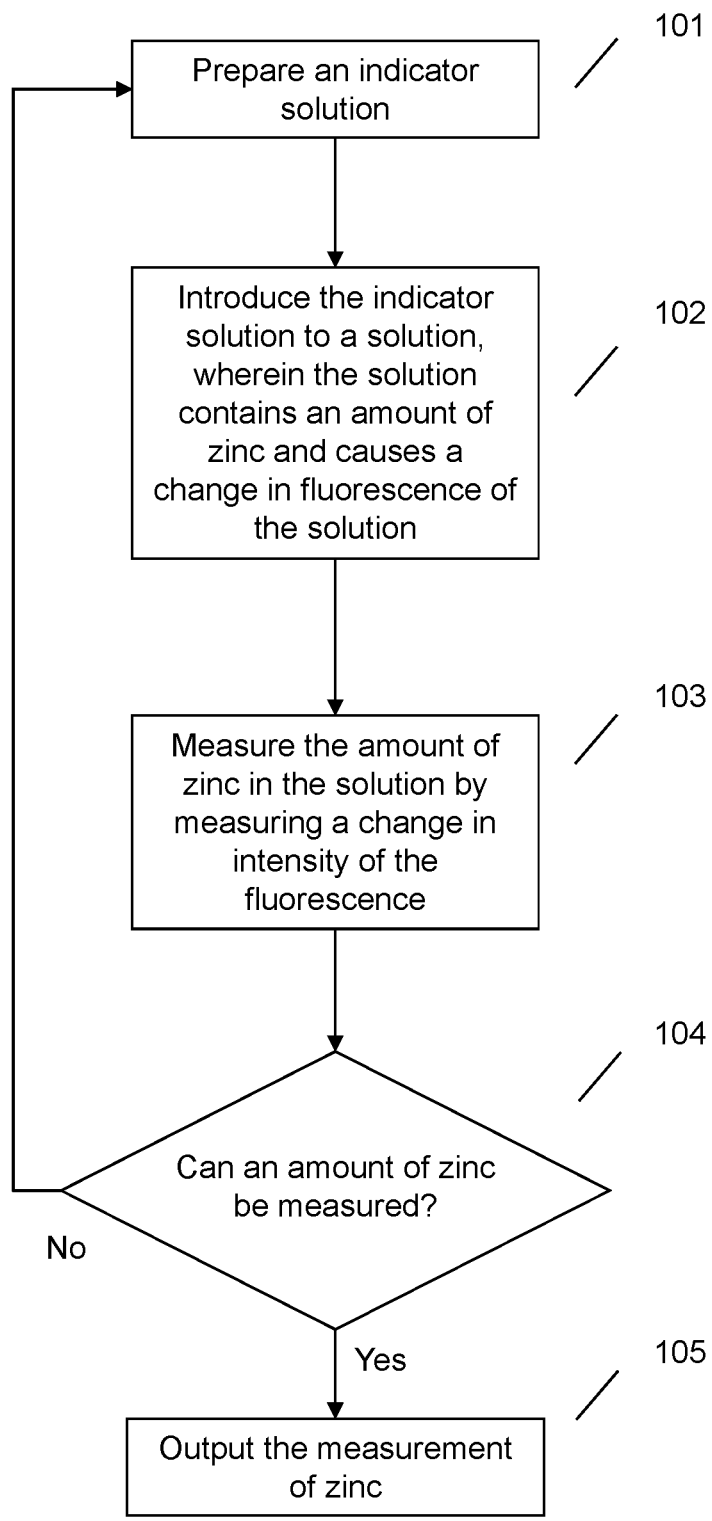
FIG. 1 illustrates a flow diagram of an example zinc measuring system.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well-known structures, materials, or operations are not shown or described in detail. The following description is intended only by way of example, and simply illustrates certain example embodiments.

Zinc measurement in water or other aqueous samples or solutions is important for many different reasons. For example, zinc measurement may be used to determine the quality of water. High concentrations of zinc may be harmful to animals, humans, and/or plants. Accordingly, as another example, a user or entity may want the zinc in a body of water to be under a particular threshold, therefore, the user may measure the zinc in order to determine if the amount of zinc is under that threshold. Zinc may be present in a body of water either naturally or from human activity such as manufacturing or storage conditions.

Conventional methods of zinc measurement and detection may have limitations discussed herein. For example, conventional methods may use cyanide, cyclohexanone, and/or chloral hydrate. Governments may have limits of use or waste disposal requirements for these conventional methods. One example method is the Hach 8009-Zincon method. This method may detect zinc (Zn(II)) in the 0.010-3.0 mg/L range. The method has approximately a 3.5 minute reaction time, and uses either a spectrophotometer (620 nm) or colorimeter (610 nm) for measurement. However, there are some limitations with this method. First, the presence of excess indicator may interfere with a visual check. Second, there may be problem using this method in the presence of interferences above a given concentration. For example, aluminum above 6 mg/L, cadmium above 0.5 mg/L, iron (III) above 7 mg/L, manganese above 5 mg/L, and nickel above 5 mg/L may interfere with proper zinc measurement. The above noted interference levels and interference types are merely illustrative and may include other concentrations and/or interferences, for example, calcium and magnesium. Third, the method uses hazardous reagents such as cyanide and/or cyclohexanone.

Another example method for zinc measurement is the LCK 360-4-(2-pyridylazo)resorcinol method. This method detects zinc (Zn(II)) in the 0.2-6.0 mg/L range or 0.24-7.2 mg/L with Crack-Set LCW 902. The method has approximately a 3.0 minute reaction time, and uses a spectrophotometer (490 nm) for measurement. However, there are some limitations with this method. First, the method is for a very small sample size, such as 0.2 mL. Second, there may be problem using this method in the presence of interferences above a given concentration such as aluminum and manganese. Other interferences include sulfate, chloride, sodium, potassium, calcium, nitrate, magnesium, iron(II and III), tin, nickel, copper, chromium, carbonate, cobalt, and/or lead. Third, the method uses hazardous reagents such as cyanide and/or chloral hydrate. The chloral hydrate may be especially problematic due to being on a list as a potential controlled sub stance.

Current methods, systems and kits for zinc measurement using the above methods using a spectrophotometric test or colorimetric test are limited because the presence of interferants can introduce significant errors in zinc measurements. Additionally, hazardous or controlled reagents make obtaining the reagents and disposal difficult. What is needed is an accurate method to measure zinc in a water sample with fewer interference concerns and less hazardous reagents.

Accordingly, an embodiment provides a system and method for measuring zinc at low concentrations with improved measurement in the presence of interferences with less hazardous reagents. In an embodiment, a fluorometric method may be used to measure zinc in an aqueous sample or solution. The solution may contain an amount of zinc to be measured. In an embodiment, a sulfonic acid indicator may be used. In an embodiment, a 8-hydroxy-5-quinoline sulfonic acid indicator may be used. The indicator may be introduced to a solution or water sample. In an embodiment, the zinc may bind to the sulfonic acid indicator causing a change in intensity of the fluorescence. Thus, a change in intensity in fluorescence may occur in response to the indicator reacting with the zinc. In an embodiment, the fluorescence intensity may be proportional to a concentration of zinc in the solution. In an embodiment the zinc may bind the indicator at a ratio of 1:2 (zinc:indicator). In an embodiment, the amount of zinc in solution may be measured by measuring a change in intensity of the fluorescence. In an embodiment, a surfactant may be added to the solution. In an embodiment, a mitigation agent may be added to the solution to prevent an interferant from binding to the indicator or prevent zinc from binding to the indicator. The solution may be titrated. The titration may be to about equal to, above, or below a pH of 6.0. In an embodiment, a pH value may be selected to minimize interferences. For example, a pH about equal to or below pH 6.0 may minimize interferences, and a pH above 6.0 may be used for a more pure water sample. In an embodiment, cyanide is not used in the method.

The illustrated example embodiments will be best understood by reference to the figures. The following description is intended only by way of example, and simply illustrates certain example embodiments.

Referring to FIG. 1, an example system and method for measurement of zinc in solution is illustrated. In an embodiment, a sulfonic acid indicator may be prepared. The sulfonic acid indicator may be introduced to a solution containing zinc. In an embodiment, the sulfonic acid indicator in the presence of zinc may cause a change in fluorescence intensity of the sulfonic acid indicator and thus the solution. Since different concentrations of zinc result in different fluorescence intensities, the change in the fluorescence intensity may be correlated to a concentration of zinc in the solution.

Figure 2:
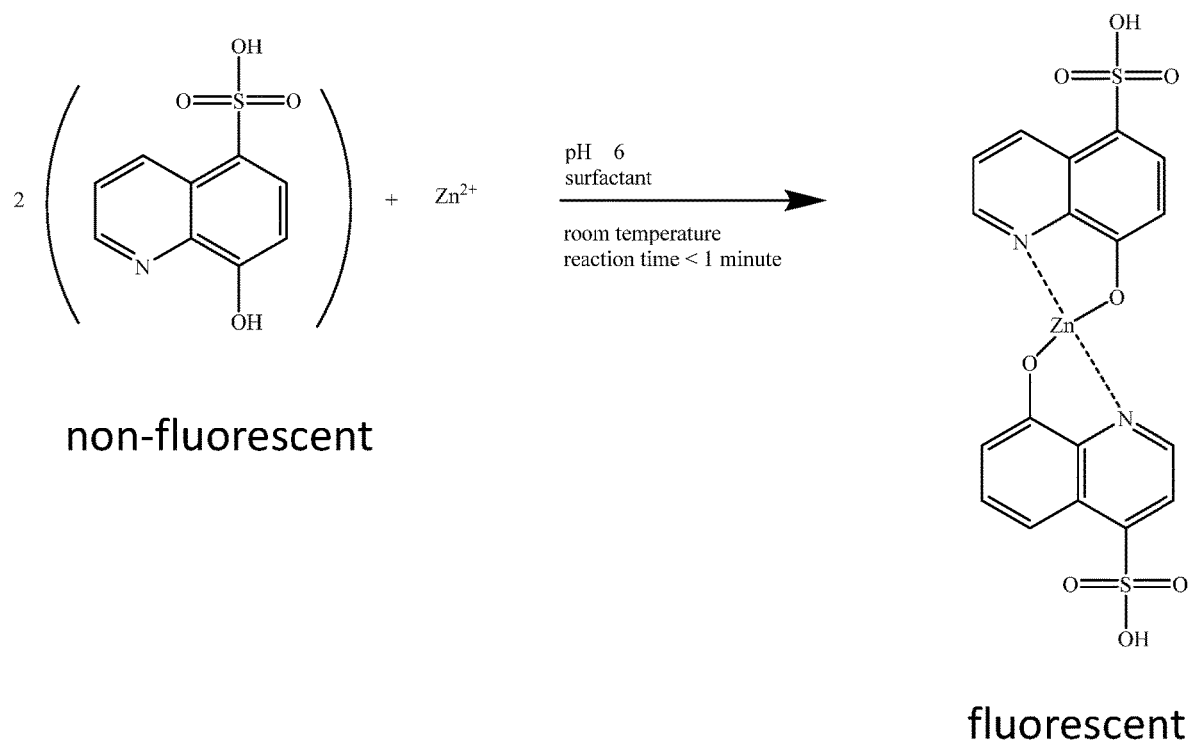
FIG. 2 illustrates a reaction scheme of an example sulfonic acid indicator for detection of zinc.

At 101, in an embodiment, a sulfonic acid indicator may be prepared. The sulfonic acid indicator may be a 8-hydroxy-5-quinoline sulfonic acid indicator (See FIG. 2). In the absence of zinc, the indicator may be non-fluorescent. In the presence of zinc, the indicator may be fluorescent. Thus, when the indicator is exposed to zinc the solution may experience a change in fluorescence. Referring to FIG. 2, an example reaction of the sulfonic acid indicator is illustrated.

At 102, in an embodiment, the sulfonic acid indicator may be introduced into a solution. The indicator may be placed into a solution at room temperature. The solution may contain an amount of zinc. In an embodiment, the zinc may cause a change in the intensity of fluorescence within the solution upon reacting with the indicator within the solution. The change in intensity of fluorescence may be proportional to the amount of zinc in the solution. The fluorescence may be triggered or increased based upon an interaction of the amount of zinc with the sulfonic acid indicator.

In an embodiment, the sulfonic acid indicator may be placed in a solution, aqueous sample, water sample or the like. The solution may be titrated. The titration may be to about equal to, above, or below a pH of 6.0. In an embodiment, a pH value may be selected to minimize interferences. For example, a pH about equal to or below pH 6.0 may minimize interferences, and a pH above 6.0 may be used for a more pure water sample. In an embodiment, a surfactant may be added to the solution. The surfactant may allow for an enhancement in the intensity of the zinc-indicator complex.

The solution may be an aqueous sample which may include a sample from a natural body of water, a holding tank, a processing tank, a pipe, or the like. The solution may be in a continuous flow, a standing volume of liquid, or any combination thereof. In one embodiment, the solution may be introduced to the sulfonic acid indicator, for example, a test chamber of the measurement device. In an embodiment, the measurement device may be a hand held device. A hand held device may have advantages such as lower cost, portability, field use, or the like. Alternatively, the measurement device may be a larger bench top device. Introduction of the solution into the measurement device may include placing or introducing the solution into a test chamber manually by a user or using a mechanical means, for example, gravity flow, a pump, pressure, fluid flow, or the like. For example, a water sample for zinc measurement may be introduced to a measurement or test chamber using a pump. In an embodiment, valves or the like may control the influx and efflux of the solution into or out of the one or more chambers, if present.

A chamber, vessel, cell, chamber, or the like may contain an aqueous sample, at least one thiocarbamate-based indicator, and associated reagents such as surfactants, acids, bases, and/or mitigation agents. A device may contain one or more bottles of reagents which contain necessary reagents. The reagents contained in the one or more bottles may be pump fed or gravity fed. The flow of the reagents may be metered to ensure proper volume delivery to the measurement cell. The aqueous sample may be fed through a pressured inlet, a vessel, or the like. The aqueous sample may be introduced into the measurement chamber by a pump or gravity fed. The sampling device may be in series or parallel to an aqueous flow. The device may have a system to ensure proper mixing of the aqueous sample, sulfonic acid indicator, and related reagents.

Additionally or alternatively, the measurement device may be present or introduced in a volume of the solution. The measurement device is then exposed to the volume of solution where it may perform measurements. The system may be a flow-through system in which a solution and/or reagents are automatically mixed and measured. Once the sample is in contact with the measurement system, the system may measure the zinc of the sample, as discussed in further detail herein. In an embodiment, the measurement device may include one or more chambers in which the one or more method steps may be performed.

At 103, in an embodiment, the system and method may measure an amount of zinc in the solution by measuring a change in the intensity of the fluorescence caused by the zinc reacting with the indicator. In an embodiment, the presence of zinc in an aqueous solution may cause an increase in fluorescence intensity of the sulfonic indicator. In an embodiment, the zinc may bind the sulfonic acid indicator. For example, zinc may bind two indicator molecules (See FIG. 2). Examples of this increase in fluorescence intensity and dose response curves for a sulfonic indicator are illustrated in FIGS. 3A-B. and FIG. 4. As illustrated, a zinc concentration from 0 to 0.080 mg/L demonstrates an MDL (method detection limit) approximation for the method using N=8 and fitting a linear curve. The MDL is calculated to be approximately 0.008 mg/L with the current method settings. Thus, the change in fluorescence of the solution may be proportional to the amount of zinc within the solution. Accordingly, a measurement device or user can correlate the measured change in fluorescence with the amount of zinc in the solution.

Figure 3:
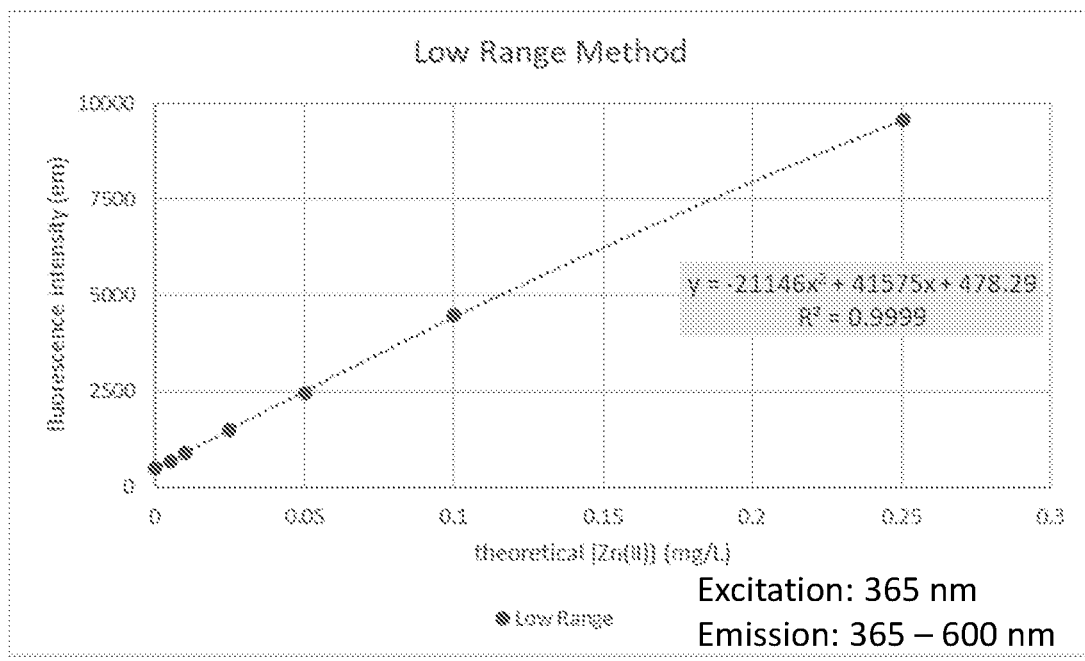
FIG. 3A-B illustrates further examples of fluorescence intensity measurement using a sulfonic acid indicator using a low and high range method.
Figure 3:
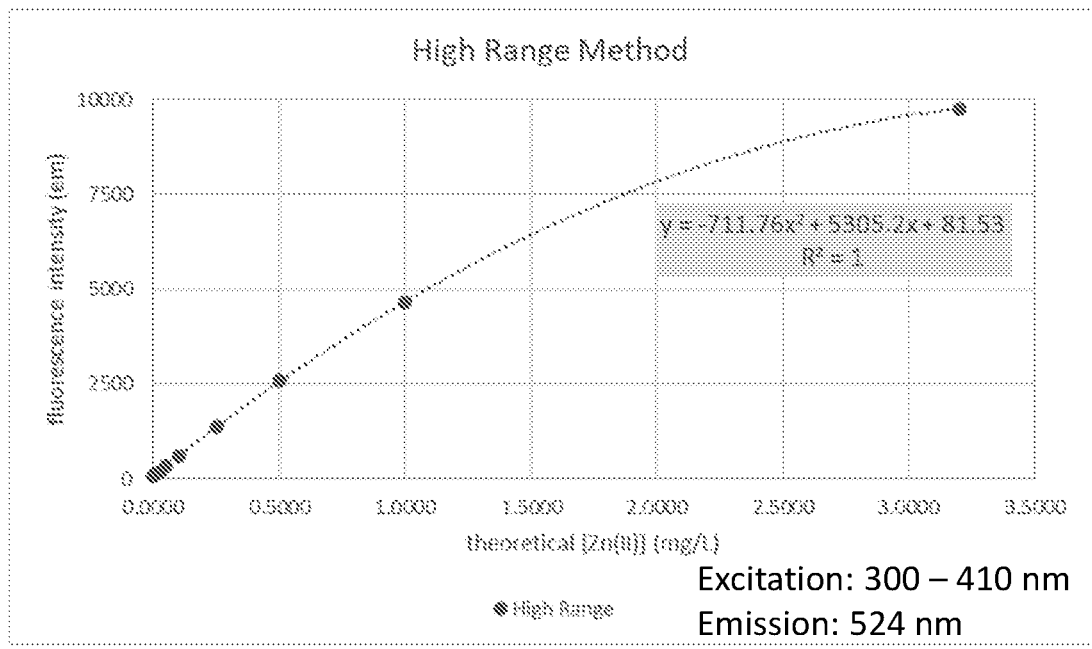
Figure 4:
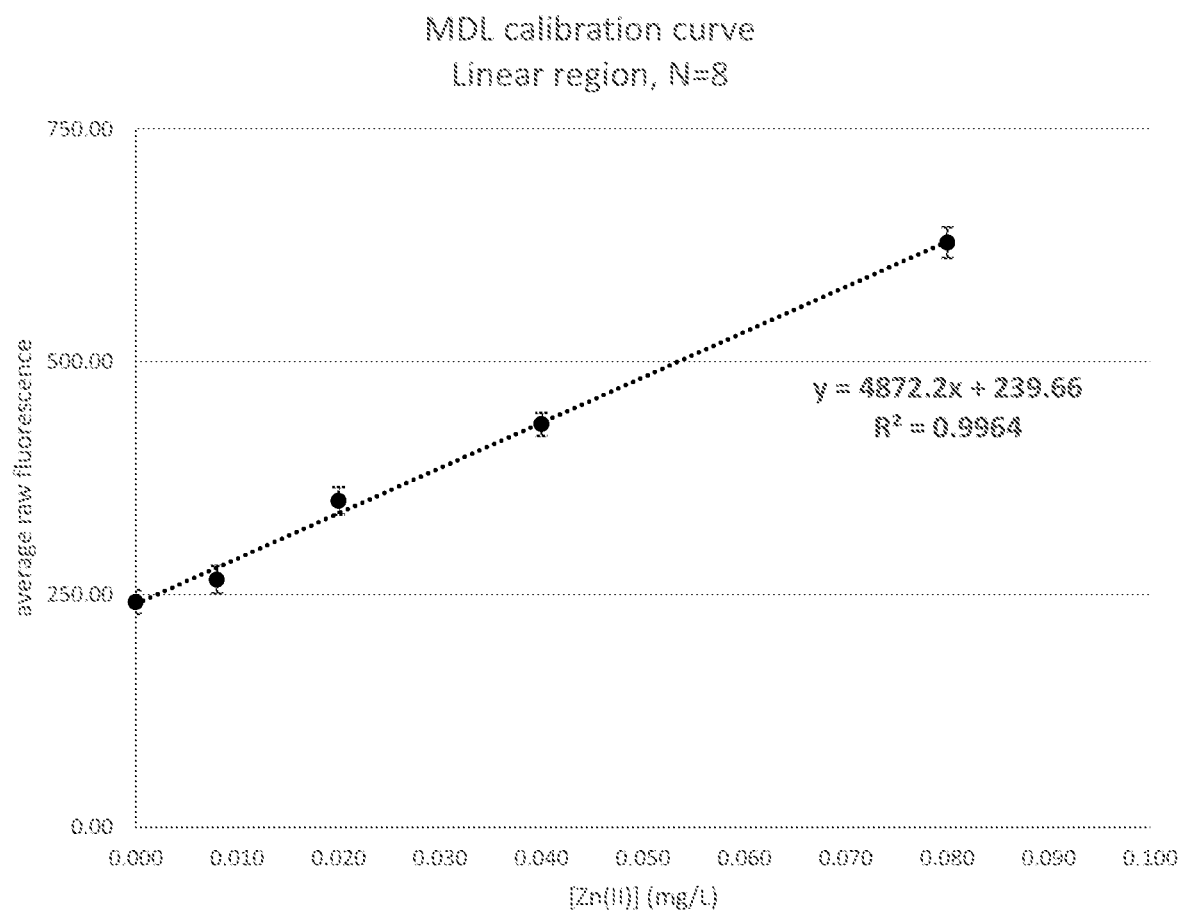
FIG. 4 illustrates an example calibration curve used to measure the MDL of the method.

Referring to FIG. 3, further examples of fluorescence intensity measurement using a sulfonic acid indicator as illustrated for a low range method (FIG. 3A) and for a high range method (FIG. 3B). In an embodiment, a low range method may be used. In an embodiment, the low range of zinc (Zn(II)) detection may be in a range of approximately 0.0 to 0.25 mg/L. The low range zinc detection may use an emission scan mode of a fluorescence spectrophotometer. The low range parameters may include an excitation wavelength of 365 nm with a sweep of emission wavelength from 365 nm to 600 nm with a photomultiplier tube (PMT) voltage of 500 V. In an embodiment, the high range of zinc (Zn(II)) detection may be in a range higher than the low detection method, for example at a concentration of 0 to 3.5 mg/L or even higher. The high range zinc detection method may use an excitation scan mode of a fluorescence spectrophotometer. For example, the emission wavelength may be 524 nm and an excitation sweep from 300 nm to 410 nm may be used with a PMT voltage of 335 V.

Therefore, the fluorescence intensity, of a solution containing zinc may be correlated to the concentration of the zinc in the aqueous solution. In an embodiment, the amount of fluorescence may be proportional to an amount or concentration of zinc in the solution. Fluorescence curves may be generated for a range of zinc concentrations, for different sulfonic acid indicators, for any different condition that may affect absorption or fluorescence values (e.g., temperature, sample content, turbidity, viscosity, measurement apparatus, aqueous sample chamber, etc.), or the like. The fluorescence curves can then be used for determining the amount of zinc in the solution.

At 104, in an embodiment, the system and method may determine if an amount of zinc may be measured. For example, an amount of zinc may be measured using the sulfonic acid indicator as described using fluorometric methods. The fluorometric measurements may be compared to expected values, historical values, or the like. Zinc measurement or fluorometric may be at periodic intervals set by the user or preprogrammed frequencies in the device. Measurement of zinc by a device allows for real time data with very little human involvement in the measurement process. In the event that the system outputs an unexpected value, the system may automatically request re-measurement of a solution or sample.

A programmed calibration curve may be entered into the device for calibrating the measurement device. In an embodiment, the system and method may be periodically tested using a known amount of zinc in the sample. The system may then recalibrate or send an error report for maintenance. In the event that the error is caused by an unclean device or that the device otherwise needs cleaned, the system may implement a cleaning cycle. Cleaning of the fluorometric chamber may be required at an unspecified time interval, after a certain number of measurements, upon user or system request, or the like. In an embodiment, a cleaning cycle of the fluorometric device may be performed using either automated or manual methods.

At 104, in an embodiment, if a concentration of zinc cannot be determined, the system may continue to measure zinc and/or a fluorescent signal. Additionally or alternatively, the system may output an alarm, log an event, or the like. If a concentration of zinc can be determined, the system may provide a measurement of zinc concentration at 105. The measurement which may be the fluorescence intensity or zinc concentration may be an output that is provided to a device in the form of a display, printing, storage, audio, haptic feedback, or the like. Alternatively or additionally, the output may be sent to another device through wired, wireless, fiber optic, Bluetooth®, near field communication, or the like.

An embodiment may use an alarm to warn of a measurement or concentration outside acceptable levels. An embodiment may use a system to shut down water output or shunt water from sources with unacceptable levels of zinc. For example, a zinc measuring device may use a relay coupled to an electrically actuated valve, or the like. The system may connect to a communication network. The system may alert a user or a network. This alert may occur whether a zinc measurement is determined or not. An alert may be in a form of audio, visual, data, storing the data to a memory device, sending the output through a connected or wireless system, printing the output or the like. The system may log information such as the measurement location, a corrective action, geographical location, time, date, number of measurement cycles, or the like. The alert or log may be automated, meaning the system may automatically output whether a correction was required or not. The system may also have associated alarms, limits, or predetermined thresholds. For example, if a zinc concentration reaches a threshold. Alarms or logs may be analyzed in real-time, stored for later use, or any combination thereof.

The various embodiments described herein thus represent a technical improvement to conventional zinc measurement techniques. Using the techniques as described herein, an embodiment may use a sulfonic acid indicator to measure zinc in solution. This is in contrast to the use of cyanide with limitations mentioned above. Such techniques provide a faster and more accurate method for measuring zinc in an aqueous or liquid solution, while using less dangerous or harmful chemicals or reagents in the zinc measurement.

Figure 5:
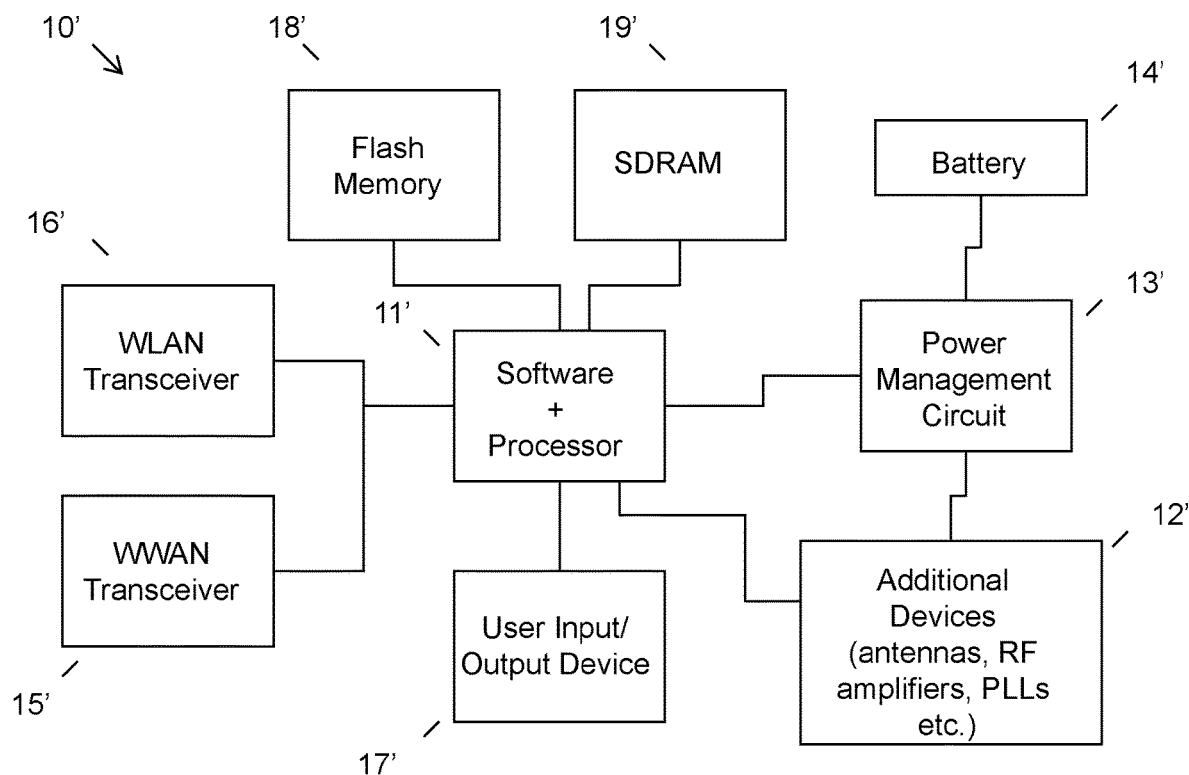
FIG. 5 illustrates an example of computer circuitry.

While various other circuits, circuitry or components may be utilized in information handling devices, with regard to an instrument for measurement of zinc according to any one of the various embodiments described herein, an example is illustrated in FIG. 5. Device circuitry 10' may include a measurement system on a chip design found, for example, a particular computing platform (e.g., mobile computing, desktop computing, etc.) Software and processor(s) are combined in a single chip 11'. Processors comprise internal arithmetic units, registers, cache memory, busses, I/O ports, etc., as is well known in the art. Internal busses and the like depend on different vendors, but essentially all the peripheral devices (12') may attach to a single chip 11'. The circuitry 10' combines the processor, memory control, and I/O controller hub all into a single chip 11'. Also, systems 10' of this type do not typically use SATA or PCI or LPC. Common interfaces, for example, include SDIO and I2C.

There are power management chip(s) 13', e.g., a battery management unit, BMU, which manage power as supplied, for example, via a rechargeable battery 14', which may be recharged by a connection to a power source (not shown). In at least one design, a single chip, such as 11', is used to supply BIOS like functionality and DRAM memory.

System 10' typically includes one or more of a WWAN transceiver 15' and a WLAN transceiver 16' for connecting to various networks, such as telecommunications networks and wireless Internet devices, e.g., access points. Additionally, devices 12' are commonly included, e.g., a transmit and receive antenna, oscillators, PLLs, etc. System 10' includes input/output devices 17' for data input and display/rendering (e.g., a computing location located away from the single beam system that is easily accessible by a user). System 10' also typically includes various memory devices, for example flash memory 18' and SDRAM 19'.

It can be appreciated from the foregoing that electronic components of one or more systems or devices may include, but are not limited to, at least one processing unit, a memory, and a communication bus or communication means that couples various components including the memory to the processing unit(s). A system or device may include or have access to a variety of device readable media. System memory may include device readable storage media in the form of volatile and/or nonvolatile memory such as read only memory (ROM) and/or random access memory (RAM). By way of example, and not limitation, system memory may also include an operating system, application programs, other program modules, and program data. The disclosed system may be used in an embodiment to perform measurement of zinc of an aqueous sample.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device, where the instructions are executed by a processor. In the context of this document, a storage device is not a signal and "non-transitory" includes all media except signal media.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and products according to various example embodiments. It will be understood that the actions and functionality may be implemented at least in part by program instructions. These program instructions may be provided to a processor of a device, e.g., a hand held measurement device, or other programmable data processing device to produce a machine, such that the instructions, which execute via a processor of the device, implement the functions/acts specified.

It is noted that the values provided herein are to be construed to include equivalent values as indicated by use of the term "about." The equivalent values will be evident to those having ordinary skill in the art, but at the least include values obtained by ordinary rounding of the last significant digit.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method for measuring zinc in a solution, comprising:
preparing an indicator solution, wherein the indicator solution comprises a sulfonic acid indicator;
introducing the indicator solution, wherein the solution contains an amount of zinc and the introducing causes a change in fluorescence of the solution in response to the indicator solution reacting with the zinc, wherein the solution comprises an interferant;
adjusting a pH of the solution, wherein the pH increases a binding of the zinc and the sulfonic acid indicator in the presence of the interferant; and
measuring the amount of zinc in the solution by measuring a change in intensity of the fluorescence and comparing the change in intensity to a calibration data selected based upon a condition of the solution comprising an interferent, wherein the condition affects a fluorescent measurement of the solution, wherein the measuring comprises an emission scan mode of a fluorescence spectrophotometer with a photomultiplier tube.

2. The method of claim 1, wherein the indicator solution comprises a 8-hydroxy-5-quinoline sulfonic acid.

3. The method of claim 1, wherein the indicator solution comprises a surfactant additive.

4. The method of claim 1, wherein the solution comprises a water sample.

5. The method of claim 1, wherein the amount of zinc comprises an amount less than 0.008 mg/L.

6. The method of claim 1, further comprising titrating a pH of the solution to a pH consisting from the group of: equal to pH 6, greater than pH 6, and less than pH of 6.

7. The method of claim 1, wherein the zinc binds to the sulfonic acid causing the change in intensity of the fluorescence.

8. The method of claim 1, wherein the fluorescence intensity is proportional to a concentration of the zinc in the solution.

9. The method of claim 1, wherein the measuring comprises measuring, without a cyanide compound, the zinc in the solution.

10. A measurement device for measuring zinc in a solution, comprising:
    a processor; and
    a memory storing instructions executable by the processor to:
    prepare an indicator solution, wherein the indicator solution comprises a sulfonic acid indicator;
    introduce the indicator solution, wherein the solution contains an amount of zinc and the introducing causes a change in fluorescence of the solution in response to the indicator solution reacting with the zinc, wherein the solution comprises an interferant;
    adjusting a pH of the solution, wherein the pH increases a binding of the zinc and the sulfonic acid indicator in the presence of the interferant; and
    measure the amount of zinc in the solution by measuring a change in intensity of the fluorescence and compare the change in intensity to a calibration data selected based upon a condition of the solution comprising an interferent, wherein the condition affects a fluorescent measurement of the solution, wherein the measuring comprises an emission scan mode of a fluorescence spectrophotometer with a photomultiplier tube.

11. The device of claim 10, wherein the indicator solution comprises a 8-hydroxy-5-quinoline sulfonic acid.

12. The device of claim 10, wherein the indicator solution comprises a surfactant additive.

13. The device of claim 10, wherein the solution comprises a water sample.

14. The device of claim 10, wherein the amount of zinc comprises an amount less than 0.008 mg/L.

15. The device of claim 10, further comprising titrating a pH of the solution to a pH consisting from the group of: equal to pH 6, greater than pH 6, and less than pH of 6.

16. The device of claim 10, wherein the zinc binds to the sulfonic acid causing the change in intensity of the fluorescence.

17. The device of claim 10, wherein the fluorescence intensity is proportional to a concentration of the zinc in the solution.

18. A method for measuring zinc in a solution, comprising:
    preparing an indicator solution, wherein the indicator solution comprises a 8-hydroxy-5-quinoline sulfonic acid;
    introducing the indicator solution and a surfactant to the solution, wherein the solution comprises a water sample and contains an amount of zinc, wherein the introducing causes a change in fluorescence of the solution in response to the indicator solution reacting with the zinc;
    adjusting a pH of the solution, wherein the pH increases a binding of the zinc and the 8-hydroxy-5-quinoline sulfonic acid in the presence of the interferant; and
    measuring the amount of zinc in the solution by measuring a change in intensity of the fluorescence and comparing the change in intensity to a calibration data selected based upon a condition of the solution comprising an interferent, wherein the condition affects a fluorescent measurement of the solution, wherein the fluorescence intensity is proportional to a concentration of the zinc in the solution, wherein the measuring comprises an emission scan mode of a fluorescence spectrophotometer with a photomultiplier tube.

\* \* \* \* \*